US005748684A

United States Patent [19]
Sanchez

[11] Patent Number: 5,748,684
[45] Date of Patent: May 5, 1998

[54] RESYNCHRONIZATION OF A SYNCHRONOUS SERIAL INTERFACE

[75] Inventor: Clifton W. Sanchez, Austin, Tex.

[73] Assignee: Crystal Semiconductor, Inc., Austin, Tex.

[21] Appl. No.: 255,828

[22] Filed: Jun. 8, 1994

Related U.S. Application Data

[63] Continuation of Ser. No. 853,117, Mar. 18, 1992, abandoned.

[51] Int. Cl.$^6$ ...................................................... H04L 7/00
[52] U.S. Cl. ............................ 375/357; 375/364; 375/368; 370/509; 370/514
[58] Field of Search ................................. 375/108, 107, 375/109, 114, 116, 357, 356, 358, 364, 365, 366, 368; 370/103, 100.1, 503, 509, 514, 510, 511, 512, 513

[56] References Cited

U.S. PATENT DOCUMENTS

| | | | |
|---|---|---|---|
| 4,613,979 | 9/1986 | Kent | 375/108 |
| 4,807,258 | 2/1989 | Sieber et al. | 375/108 |
| 4,910,754 | 3/1990 | Allen et al. | 375/108 |
| 4,942,523 | 7/1990 | Gembarowski | 375/108 |

FOREIGN PATENT DOCUMENTS 2 163 028   7/1985   United Kingdom .

OTHER PUBLICATIONS

"Serial Communications Interface," Motorola MC68HC705C8 Technical Data, Section 5, Motorola Inc., 1989, pp. 5–1 to 5–3.

Abdul Aleaf, "Microwire Serial Interface," Application Note 452, Microcontroller Data Book, National Semiconductor Corp., 1987, pp. 4–128 to 4–138.

"Serial Peripheral Interface," Motorola MC68HC705C8 Technical Data, Section 6, Motorola Inc., 1989, pp. 6–1 to 6–5.

"Serial Peripheral Interface (SPI) Module," TMS370 Family Data Manual, Texas Instruments Incorporated, 1988, pp. 10–1 to 10–17.

"I$^2$C Bus Specification," Signetics Linear Products, Dec. 1988, pp. 4–1 to 4–12.

"Serial Output 5.6µs 12–Bis A/D Convrter," 1900 New Releases Data Book, Maxim Integrated Products, pp. 1–73, 1–75 to 1–78, 1–82 to 1–83.

"1,2,6 and 8 Channel, 10–Bit Serial I/O Data Acquisition Systems," 1990 Linear Data Book, Linear Technology, pp. 9–29, 9–39, to 9–48.

"TMS7000 Family Architecture—Serial Port (TMS70×2 and TMS70C×2)," TMS7000 Family Data Manual, Texas Instruments Incorporated, 1986, pp. 3–64.

Spragins et al., "Telecommunications Protocols and Design," Feb. 1991, pp. 323–327.

*Primary Examiner*—Don N. Vo
*Attorney, Agent, or Firm*—Robert D. Lott; J. P. Violette

[57] ABSTRACT

A synchronous serial communication link between a controller and a peripheral is resynchronized by the sending of a series of bits at a first logic level by the controller. The series of bits is long enough to ensure that the peripheral will decode a command word in which all of the bits are at the first logic level. The peripheral, upon decoding such a command word, resets the synchronization circuitry within the peripheral. The controller then sends a single bit of the opposite logic state followed by serial data. The peripheral, upon receipt of this bit of the opposite logic state, releases the synchronization circuitry from its reset condition and begins to decode the serial data in synchronization with the controller.

15 Claims, 4 Drawing Sheets

WRITE OPERATION

READ OPERATION

WRITE OPERATION

READ OPERATION

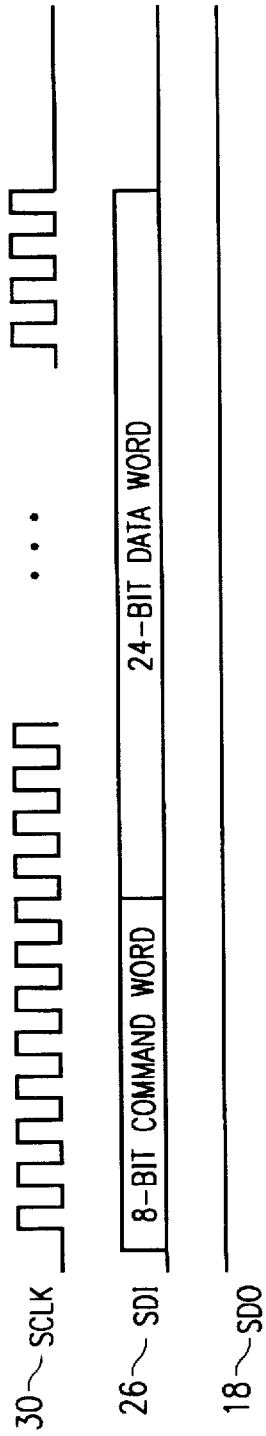
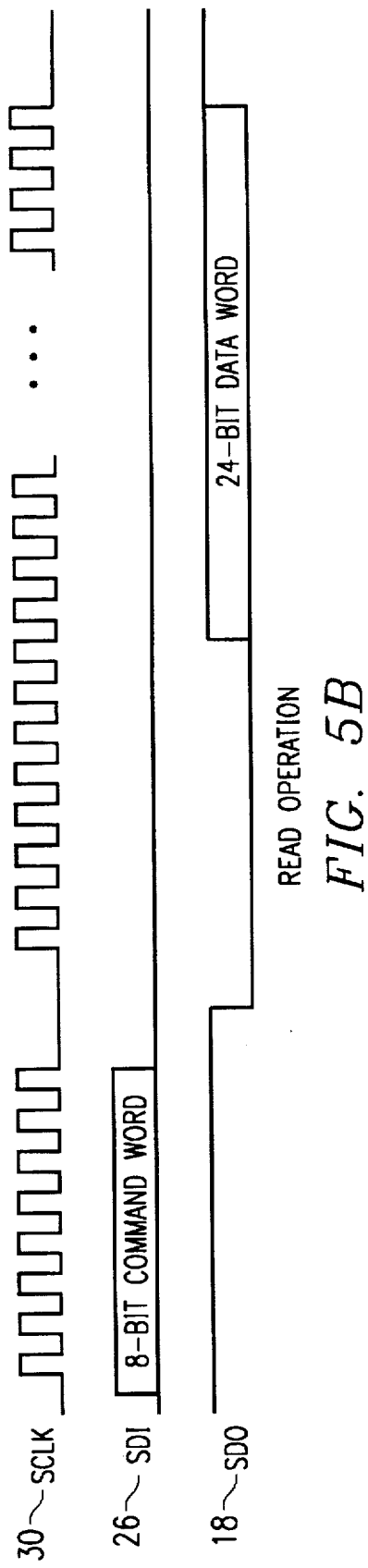
FIG. 5A — WRITE OPERATION
FIG. 5B — READ OPERATION

RESYNCHRONIZATION OF A SYNCHRONOUS SERIAL INTERFACE

This is a continuation of application Ser. No. 07/853,117, filed on Mar. 18, 1992 abandoned.

TECHNICAL FIELD

This invention relates to synchronous serial interfaces that include clock and data, and more particularly, to resynchronization of a synchronous serial interface.

BACKGROUND OF THE INVENTION

Data exchange in electronic systems is accomplished in a serial or parallel format. Parallel communications between devices usually requires a large number of data bits. Serial communications are used to transmit data serially, rather than in parallel, between two or more devices. Serial communications, while generally slower than parallel communications, has the advantage of requiring far fewer number of lines and the ability to transmit data over a large distance at lower cost. Also, since only a few pins need to be dedicated to serial communications, many microcontrollers have built in serial ports. In serial communications, where data is sent down one line, there is an inherent need to know where the boundary of the data word is for decoding the data stream. If the boundary point changes between the two devices, the data will be misinterpreted and the serial exchange of data will cease to function properly.

Serial communications can be either synchronous or asynchronous. In synchronous communications both the data and clock are transmitted between the devices and requires an extra line, such as a chip select or reset, for synchronization. In asynchronous serial communications only data is transmitted between the two devices. In asynchronous communications data packets are preceded by start bits and followed by stop bits which are used to synchronize the two devices. For example, the RS232 standard requires at least one start bit before, and one stop bit after every word. A word in this case is five to eight bits.

In asynchronous serial communications, the receiving device extracts the clock from the data by oversampling the incoming data stream in which data packets are surrounded by start and stop bits. Therefore, because of the oversampling requirement and overhead of start and stop bits, asynchronous communications has inherently lower data bandwidth than that of a synchronous data communications protocol.

Synchronous serial communications must also have some method to resynchronize the word boundaries between the transmitting and receiving devices. A method to realign the word boundaries is for one device to reset the other device using a separate line (such as a chip select line or reset line). This extra line, needed only in case of failure and when the data transmission is first started, adds expense to the interface. FIG. 1 is an illustration of a typical synchronous serial port. In this diagram data is shifted between the controller and a peripheral. The controller is considered the master since it controls data transfers and may generate a serial clock, labeled SCLK. In this diagram data is transferred out of the peripheral shift register and into the controller shift register. At the same time, data is transferred out of the controller shift register and into the peripheral shift register. Chip select bar, labeled $\overline{CS}$, enables the serial port and when active, indicates when data is to shift and, when inactive, indicates that data is halted or finished.

Peripherals are external integrated circuits or integrated systems that provide extra functionality to the controller. Some peripherals acquire information or data external to the system. In these systems there needs to be an indication that data is available for the controller. One example is an A/D converter that converts analog information into digital form to be processed. The A/D converter requires a protocol to indicate when conversion is finished. Another example is a UART (Universal Asynchronous Receiver Transmitter) that acquires information sent down a transmission line. In this example the UART is waiting for information to be received and needs a way to inform the controller that it has received the data. This indication can take many forms. One method is to have a counter in the controller that waits a predetermined amount of time. This method requires circuitry inside the controller which may be better used for other functions. Another method is to have a dedicated pin that indicates when data is available. This method adds cost to the interface, since an extra line is needed between the controller and peripheral, but maintains maximum bandwidth. A third method is to send status information, indicating the data is available, via the serial data line. This method requires bandwidth but obviates the need for an extra line between the two devices. Still another method used with synchronous serial communications is to use a start bit to indicate the beginning of the transmission of every data word. In this case first a large number of bits opposite to the start bit are sent to flush the receiving device, then the data word preceded by a start bit is sent. This is similar to asynchronous protocols since it uses the exact method asynchronous interfaces use but requires a clock. This method uses bandwidth by requiring a bit (the first one) of every word transfer to resynchronize as is done in conventionally asynchronous communications.

Therefore, it can be appreciated that a resynchronization of the two devices which does not require an additional line or pin between the controller and peripheral devices and does not significantly reduce the bit transfer rate is highly desirable.

SUMMARY OF THE INVENTION

It is therefore an object of this invention to provide a resynchronization of a synchronous serial interface which does not require an additional synchronization line and which does not significantly reduce the bandwidth of the interface while still allowing the peripheral to be easily connected to standard serial ports provided on controllers.

Described and shown in an illustrated embodiment of the invention is a method for resynchronizing a synchronous serial interface between two devices in which the data of the serial interface comprises a combination of command words and data words. The two devices are a controller, which sends the command words and sends or receives data words, and a peripheral, which receives command words and data words and optionally sends data words back to the controller. The resynchronization method includes transmitting a sequence of a predetermined bit pattern from a controller wherein the pattern sequence is long enough that the peripheral will decode at least a portion of the sequence of serial data as a command word. The peripheral is reset upon receipt of a command word which has this predetermined logic pattern. The controller then transmits one bit opposite to the logic state of the next bit in the pattern which indicates the alignment and causes the peripheral to come out of reset. Now the peripheral and controller are resynchronized in regards to the location of word boundaries and normal operation can continue.

In a further aspect of the invention, the predetermined bit pattern is a sequence of bits at a first logic state. The peripheral is reset upon receipt of a command word which has all bits at the first logic state. The controller then transmits one bit opposite to the first logic state which indicates the alignment and causes the peripheral to come out of reset. Controllers that work with a fixed word length may send an entire word of the first logic state with the last bit inverted which marks the boundary of the word.

BRIEF DESCRIPTION OF THE DRAWINGS

The aforementioned and other features, characteristics, advantages, and the invention in general, will be better understood from the following, more detailed description taken in conjunction with the accompanying drawings, in which:

FIG. 5A is a timing diagram of the synchronous serial interface shown in FIG. 4 during a write operation;

FIG. 5B is a timing diagram of the synchronous serial interface of FIG. 4 during a read operation.

Figure 1:
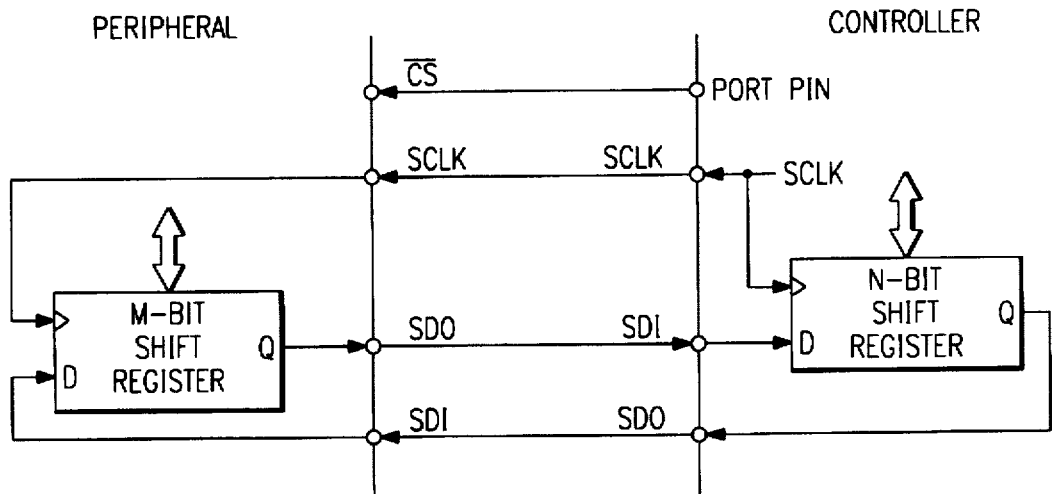
FIG. 1 is a block diagram of a prior art synchronous serial port.

It will be appreciated that for purposes of clarity and where deemed appropriate, reference numerals have been repeated in the figures to indicate corresponding features, and that the timing signals shown in FIGS. 3A, 3B, 5A, and 5B have not necessarily been drawn to scale in order to more clearly show timing relationships in the preferred embodiment of the present invention.

DESCRIPTION OF THE PREFERRED EMBODIMENT

The resynchronization of the synchronous serial interface according to the preferred embodiment of the present invention is applicable to a synchronous serial interface which includes two data pins, for data transmitted from the controller to the peripheral and for data transmitted from the peripheral to the controller, and a serial clock which is transmitted from the controller to the peripheral. In the preferred embodiment the serial data comprises a combination of command words and data words in which the command words, sent by the controller, give instructions as to what data is to be placed on the serial interface.

The resynchronization is used when the controller detects that the peripheral and the controller are not in synchronization, which detection may be of any of several different forms including the recognition by the controller of obviously erroneous data from the peripheral, by the controller verifying data written into the peripheral, or by other similar types of error detection methods. When an out of sync condition is detected, the controller then sends a continuous stream of logic bits of one logic level, for example, logic one state. The stream of continuous bits must be long enough to ensure that the peripheral will decode a full command word of all logical one bits. In the peripheral, receipt of a command word in which all bits are a logical one will cause the peripheral to go into a reset condition and wait for receipt of a first bit in the opposite logical state, in this example a logic zero. In the controller, after sending the sequence of sufficient duration of the logic one bits, the controller will send at least one bit set to logic zero to indicate the boundary of the unit number of bits and the end of the resync pattern. Similarly, the peripheral, upon receipt of the logic zero bit, will remove the reset condition and will then decode the next series of bits as a command word at which time the peripheral and the controller will be in sync.

Figure 2:
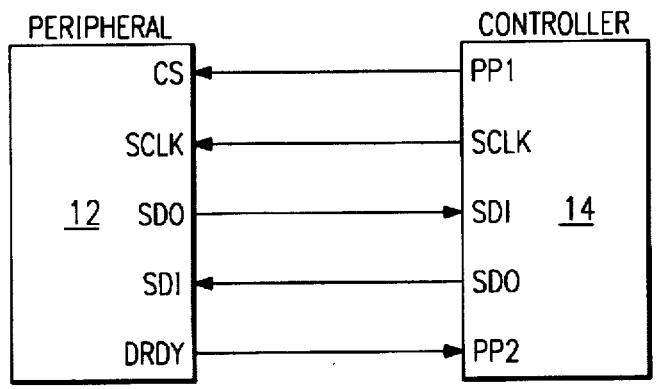
FIG. 2 is a block diagram of a five line synchronous serial interface according to the present invention.
Figure 3A:
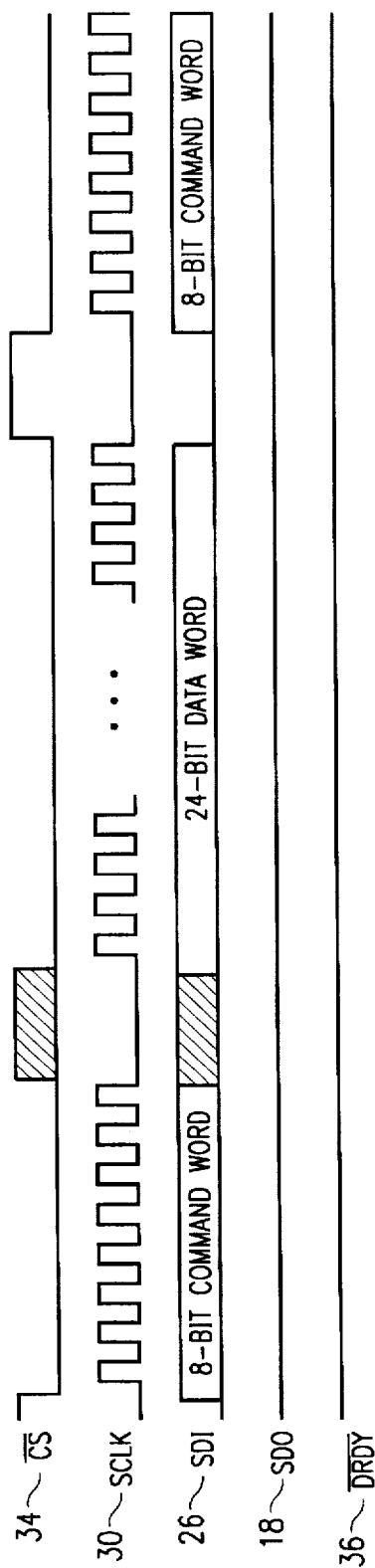
FIG. 3A is a timing diagram of the synchronous serial interface shown in FIG. 2 during a write operation.
Figure 3B:
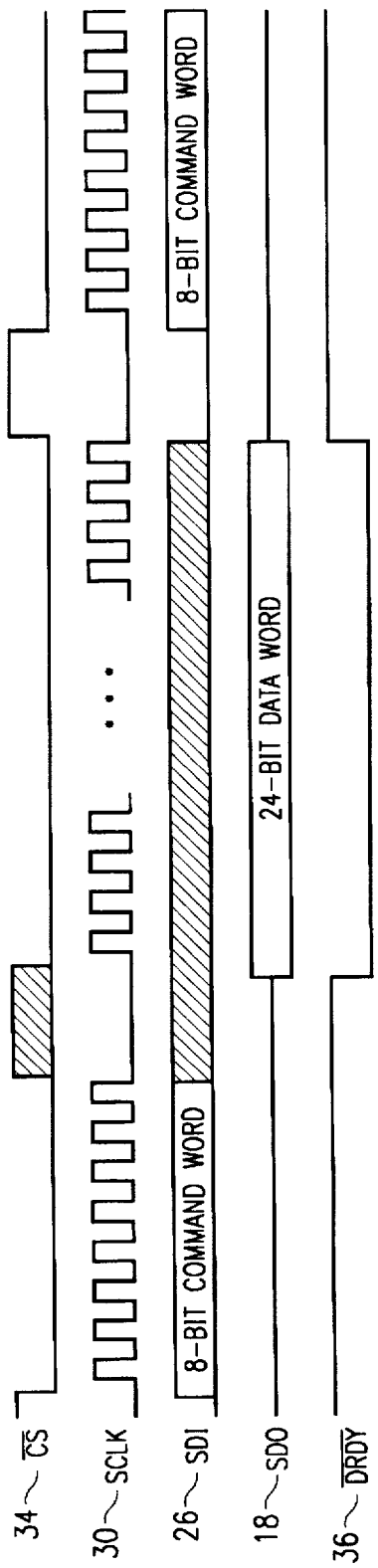
FIG. 3B is a timing diagram of the synchronous serial interface of FIG. 2 during a read operation.

The subject of this invention is utilized in a five pin serial port located in a peripheral 12 as shown in FIG. 2. The operation of the signals is shown in FIGS. 3A and 3B. The serial clock, SCLK, is an input to the peripheral 12 and controls the clocking of data into the serial data in pin, SDI, and out of the serial data out pin, SDO. The chip select bar pin, $\overline{CS}$, enables the serial port function. The data ready bar pin, $\overline{DRDY}$, provides an indication when data is ready to be read from the peripheral 12. The serial data communications protocol between the controller and the peripheral is comprised of command words and data words.

As the master, the controller 14 sends command words to the peripheral (slave). The peripheral receives and responds to the commands which consist of read or write operations. In a write operation the peripheral would wait for the data following the command word to be received on the SDI pin as shown in FIG. 3A. In a read operation the peripheral 12 would provide data requested by the command word via the SDO pin, data availability being indicated by the $\overline{DRDY}$ pin as shown in FIG. 3B.

Although a five line serial interface has been described, a three line serial interface will be used to describe the preferred embodiment without any loss of generality. In the preferred embodiment, the controllers serial port is connected to a single peripheral. Since only one peripheral is used, the peripheral can be continuously enabled by connecting the $\overline{CS}$ pin low at the peripheral and removing the $\overline{CS}$ line from the serial interface. Using this scheme the controller must only send SCLKs when needed. In addition to the removal of the $\overline{CS}$ line, the DRDY signal is embedded in the SDO pin as described below and shown in FIG. 5B. Although embedding the $\overline{DRDY}$ signal in the data stream reduces the bandwidth slightly, the number of interface pins is minimized to three. This mode is called the "reduced" mode and is shown in FIG. 4.

Figure 4:
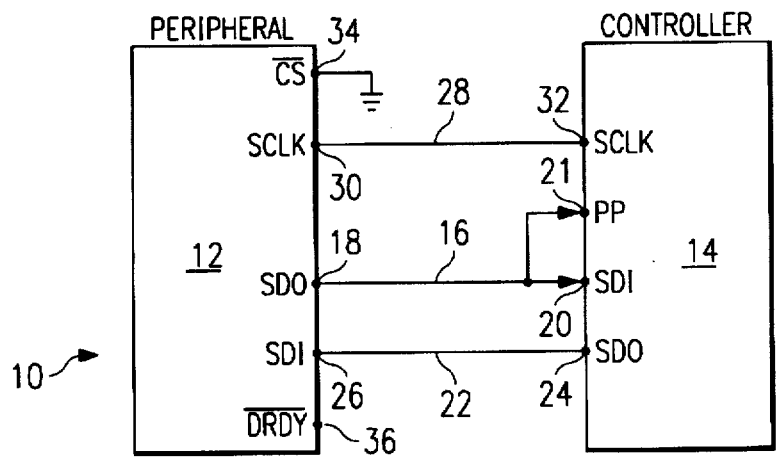
FIG. 4 is a block diagram of a three line synchronous serial interface according to the present invention.

FIG. 4 is a block diagram of the synchronous serial interface 10 according to the preferred embodiment of the present invention. Shown in FIG. 4 is a controller 14 and a peripheral 12 which are coupled together by a synchronous serial interface which includes a first data line 16 which transmits data from a SDO pin 18 of the peripheral 12 to a SDI pin 20 and to a PP pin 21 of the controller 14, and a second data line 22 which transfers data from a SDO pin 24 of the controller 14 to a SDI pin 26 of the peripheral 12. A third line 28 connects the clock transmitted from a SCLK pin 32 of the controller 14 to a SCLK pin 30 of the peripheral 12. A fourth pin 34 is a chip select for the peripheral 12 and is tied to ground which always enables the synchronous serial port on peripheral 12. A fifth pin 36 is the data ready indication for the peripheral 12, which in the preferred embodiment is an analog-to-digital converter, and is not used in the preferred embodiment since the data ready indication will be included in the SDO pin 18.

FIGS. 5A and 5B are timing diagrams of the signals at the peripheral circuit 12 for the SCLK pin 30, the SDI pin 26, and the SDO pin 18 when the peripheral 12 and the controller 14 are in synchronization. In the example shown in FIGS. 5A and 5B the serial data consist of an 8-bit command word followed by a 24-bit data word. During a write operation, after receipt by the peripheral 12 of the 8-bit command word, the peripheral 12 accepts the next 24-bit data word at the SDI pin 26. During a read operation, after receipt by the peripheral 12 of the 8-bit command word, the peripheral 12 drives SDO low when the requested data is available. The controller 14 reads PP, pin 21 which indicates that the data is ready, and clocks 8 bits on the SCLK pin 32 to clear the data ready status and then reads the 24-bit data word on the SDI pin 20. In FIGS. 5A and 5B the peripheral and the controller are in synchronization.

If the peripheral 12 and the controller 14 are not using the same 8 bits for the command word then the peripheral will misinterpret the command. The controller 14, upon recognition of an out of sync condition, will issue a series of logic bits of a single logic state, for example a logic one level is used in the preferred embodiment. The series of logic bits must be long enough to ensure that the peripheral 12 will receive and decode a command word wherein all the bits are logic one levels.

Figure 6:
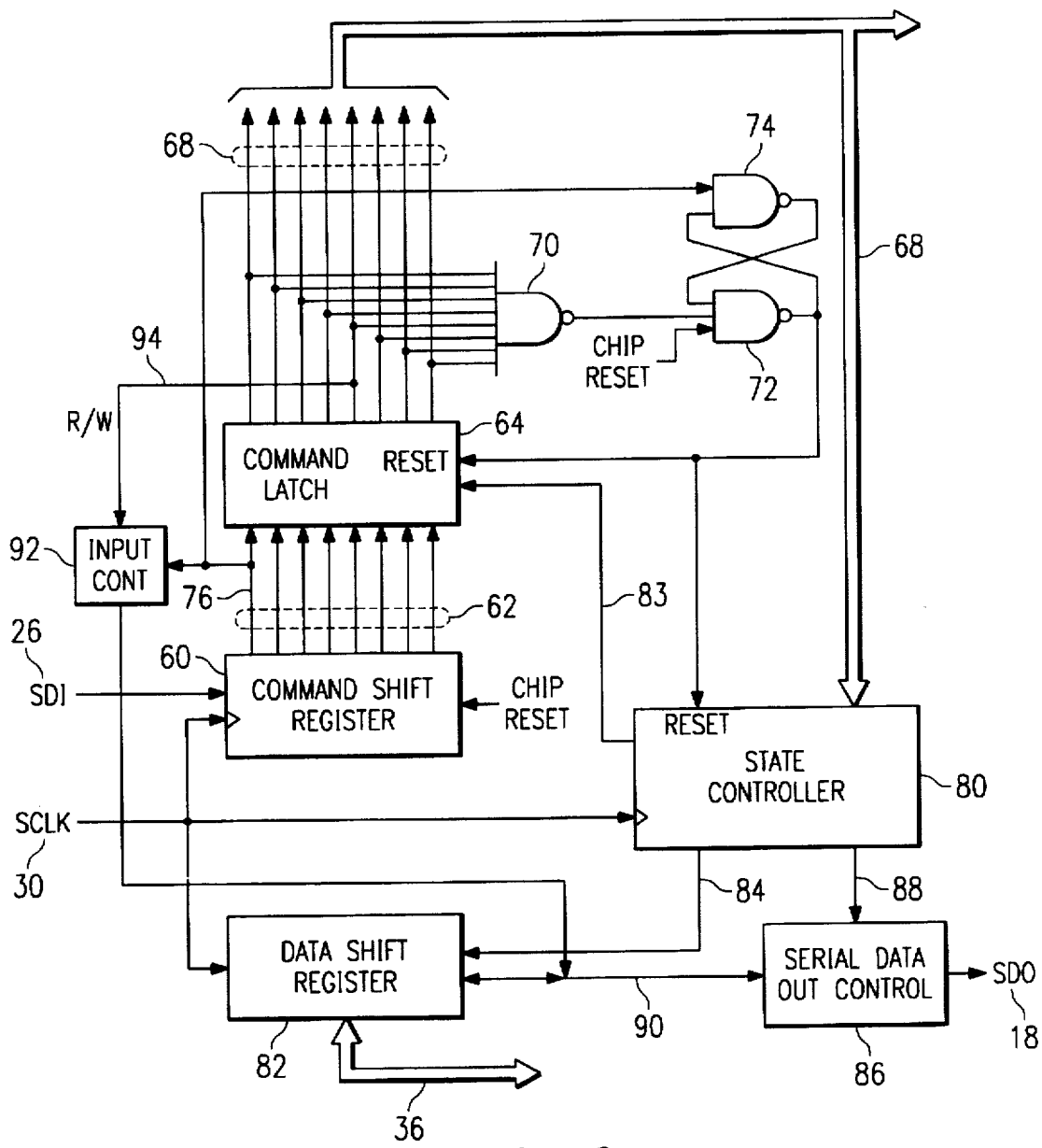
FIG. 6 is a logic diagram of circuitry within the peripheral according to the preferred embodiment of the invention for performing the resynchronization of the peripheral.

FIG. 6 is a logic diagram of the preferred embodiment of the serial communication portion of the peripheral 12. The state controller 80 receives the command word on bus 68, and contains a counter that is clocked via SCLK pin 30 and provides control signals to the command latch 64 by a control line 83 and to a data shift register 82 by a control line 84 and to a serial data out control circuit 86 by another control line 88. As shown in FIG. 6, the SDI pin 26 enters a command shift register 60 which is clocked from the signal on the SCLK pin 30. The shift register 60 forms a serial-to-parallel converter providing 8 lines of parallel data on the bus 62. The 8 lines on the bus 62 are latched in a command latch 64 which is clocked from the line 83 from the state controller 80. The command latch 64 has 8 output lines on a bus 68 which go to the state controller 80 as well as other circuitry inside the peripheral 12 and not shown in the drawings. The 8 lines of the bus 68 are also connected to an 8-input NAND gate 70 the output of which is connected to one input to a pair of cross-coupled NAND gates 72 and 74. Specifically, the output of the NAND gate 70 is connected to one input of the NAND gate 72. The output of the NAND gate 72 is connected to a reset input of the command latch 64, to a reset input of the state controller 80, and also to one input of the NAND gate 74. The output of the NAND gate 74 is connected to the second input of the NAND gate 72. The second input of the NAND gate 74 is connected to a line 76 which is one of the lines of the bus 62. The line 76 provides the logic state of the most recently received data bit on the SDI pin 26.

The data shift register 82 is 24 bits in length and clocked by the serial clock signal SCLK and has a combination input/output terminal connected to a line 90. The state controller 80 is clocked by the SCLK pin 30 and counts the command bits and data bits so that when the data bits are being received or transmitted, line 84 from the state controller 80 either enables the proper bit in the data shift register 82 onto line 90 or loads the bit on line 90 into the proper bit in the data shift register 82, the direction of which is controlled by the read/write line 94 from the command latch 64. The data shift register 82 is also connected to the data bus 36 of the peripheral 12 which goes to other circuitry inside the peripheral 12 and not shown in the drawings. The line 90 is connected to the data input of the serial data out control circuit 86. The output of the serial data out control circuit 86 forms the serial data out signal SDO, pin 18. Also connected to line 90 is the output of an input control circuit 92. The input control circuit 92 receives a read/write (R/W) signal on a line 94 which is connected to the read/write bit of the command word at the output of the command latch 64. The input control circuit 92 receives input data from line 76.

When data is written into the peripheral 12, the state controller 80 receives the write command word on bus 68 and enables the data shift register 82 to shift data into the register from line 90. Input data is placed on the line 90 by the input control circuit 92 which receives the data from line 76 and passes the data to line 90 in response to the R/W line 94 being in the write logic state. The serial data out control is inhibited during this operation. When the serial data has been received, it is transferred to the peripheral data bus 36.

When data is to be read from the peripheral 12, the read command causes the input control circuit 92 to provide a high impedance output to permit data from the shift register 82 to be placed on the line 90. After the state controller 80 receives the read command, the peripheral 12 transfers the requested data onto the bus 36 and then into the shift register 82. When the data is ready in the shift register 82, it is passed serially out of the shift register 82, onto line 90, and through the serial data out control 86 onto the SDO pin 18 of the peripheral 12.

However the peripheral may not be able to decode the read command and provide the first output data bit onto the SDO terminal within one SCLK clock period. Therefore the timing shown in FIG. 5B illustrates the process of reading data out of the peripheral 12. As shown in FIG. 5B, during and after receipt of the read command, the SDO output is held high (logic 1 level) until the peripheral is ready to transfer the data onto the SDO pin 18. When the peripheral is ready, the SDO output is brought low (logic 0 level). At that time the peripheral delays the serial data word for 8 clock periods to clear the data ready indication. The 8-bit delay before data is available was selected as the most common word length supported by controllers. This 8-bit delay reduces the bandwidth of the serial data communication interface but minimized the number of connections needed between the peripheral 12 and the controller 14.

In the preferred embodiment, the 8 bit delay occurs after the read command from the controller 14. If no other commands are received by the peripheral 12 before the next set of data is ready (which in the preferred embodiment is produced by an analog-to-digital conversion), the peripheral 12 sends the new data to the controller 14 automatically without the need for a read command.

In operation the SDI data on pin 26 is shifted through the command shift register 60 in synchronization with the clock on the SCLK pin 30. The shift register 60 is 8 bits in length and the outputs of the shift register 60 are present on the bus 62 and presented as inputs to the command latch 64. The state controller 80 is clocked by the SCLK pin 30 and counts the number of command bits and data bits so that when 8 bits of command have been received it provides an output signal 83 to the command latch 64 and the command latch 64 latches the data on the input bus 62 onto the output bus 68. In this manner, the serial command words on the SDI pin 26 are converted to an 8-bit parallel word on the 8-bit bus 68 for use by the peripheral 12. In normal operation, the output of the NAND gate 72 is a logic zero level (all commands other than the resynchronization command must have at least one logic zero in the preferred embodiment) and the reset lines into the state controller 80 and the command latch 64 are held low to allow the command latch 64 and the state controller 80 to operate normally.

When the peripheral 12 receives a command word of all logic ones, the NAND gate 70 provides a logic level zero at its output which forces the output of the NAND gate 72 to a logic one which resets the command latch 64 and the state controller 80. When the command latch 64 is reset, it forces its outputs on bus 68 to an all logic zero condition. This causes the output of the NAND gate 70 to become a logic one, but the cross-coupled NAND gates 72 and 74 remain in a reset condition (logic one out of NAND gate 72).

Upon receipt of the logic zero at the SDI pin 26, the line 76 out of the command shift register 60 becomes a logic zero which forces the output of the NAND gate 74 to a logic one. Since both inputs of the NAND gate 72 are now a logic one the output becomes a logic zero which removes the reset condition (changes to a set condition) of the cross coupled NAND gates 72 and 74. The changing to a logic zero at the output of the NAND gate 72 releases a reset on the inputs to the command latch 64 and the state controller 80. Upon receipt of the next clock signal on the SCLK pin 30 the state controller 80 starts operating normally and counting the next 8 bits of the command word which are latched by the command latch 64 after the receipt of the 8th command bit. In this manner, then the peripheral 12 becomes resynchronized with the controller 14. A chip reset signal is an input to NAND gate 72 and the command shift register 60. This reset signal comes from another pin on the peripheral 12 and is not part of the serial port resynchronization circuit but is included for completeness.

Thus there has been described a synchronous serial interface which does not require a separate synchronization line. Resynchronization of the serial interface is not performed at regular intervals, but only as needed when an out of sync condition is detected.

Although the invention has been described in part by making detailed reference to a certain specific embodiment, such detail is intended to be, and will be understood to be, instructional rather than restrictive. It will be appreciated by those skilled in the art that many variations may be made in the structure and mode of operation without departing from the spirit and scope of the invention as disclosed in the teachings contained herein.

What is claimed is:

1. A method for resynchronizing a synchronous serial communication channel between a controller and a peripheral, the data on said synchronous serial communication channel comprising a combination of command words and data words without any synchronization bits during normal operation, said method for resynchronizing comprises the steps of:
   (a) transmitting a sequence of a repeating predetermined bit pattern from said controller, said repeating predetermined bit pattern being of a long enough duration such that said peripheral will decode at least a portion of said repeating predetermined bit pattern as a command word;
   (b) resetting said peripheral upon receipt by said peripheral of said command word having bits according to said repeating predetermined bit pattern;
   (c) transmitting from said controller, after the transmission of said predetermined bit pattern of said long enough duration, a different pattern than said repeating predetermined bit pattern and then normal serial data;
   (d) detecting, in said peripheral, a first bit opposite to the logic state of the next bit in said predetermined bit pattern, and decoding the next series of bits as normal serial data.

2. The method set forth in claim 1 wherein said predetermined bit pattern are all bits of a first logic state.

3. A method for communicating serial data between a controller and a peripheral comprising the steps of:
   a) transferring serial data from said controller to said peripheral on a data in line;
   b) transferring serial data from said peripheral to said controller on a data out line;
   c) transferring a serial clock signal from said controller to said peripheral on a serial clock line;
   d) enabling the transfer of serial data from said peripheral to said controller by transmitting an enable signal from said controller to said peripheral on a chip select line;
   e) transmitting a data ready signal from said peripheral to said controller on a data ready line when said peripheral is ready to send serial data to said controller; and
   f) resynchronizing said peripheral with said controller by the method set forth in claim 1.

4. A method for communicating serial data between a controller and a peripheral comprising the steps of:
   a) transferring serial data from said controller to said peripheral on a data in line;
   b) transferring serial data from said peripheral to said controller on a data out line, said serial data including a predetermined data ready bit pattern indicative of a data ready condition of said peripheral, said predetermined data ready bit pattern being sent before other serial data after said controller sends a command to said peripheral to transmit said other data;
   c) transferring a serial clock signal from said controller to said peripheral on a serial clock line; and
   d) resynchronizing said peripheral with said controller by the method set forth in claim 1.

5. A method for communicating serial data between a controller and a peripheral comprising the steps of:
   a) transferring serial data from said controller to said peripheral on a data in line;
   b) transferring serial data from said peripheral to said controller on a data out line, said serial data from said peripheral being sent to said controller in synchronization with the next clock cycle of a serial clock signal after said controller sends a command to said peripheral to transmit serial data;
   c) transferring said serial clock signal from said controller to said peripheral on a serial clock line; and
   d) resynchronizing said peripheral with said controller by the method set forth in claim 1.

6. A method for communicating serial data between a controller and a peripheral comprising the steps of:
   a) transferring serial data from said controller to said peripheral on a data in line;
   b) transferring serial data from said peripheral to said controller on a data out line, said serial data from said peripheral being sent to said controller after a predetermined delay after said controller sends a command to said peripheral to transmit serial data;
   c) transferring a serial clock signal from said controller to said peripheral on a serial clock line; and
   d) resynchronizing said peripheral with said controller by the method set forth in claim 1.

7. In a peripheral which receives serial synchronous data at a serial input terminal of said peripheral, and wherein said data, in normal operation, does not contain any synchronization bits, circuitry for resynchronizing said peripheral comprising:

(a) a counter circuit coupled to a serial clock input terminal of said serial communication channel for providing an output indicating when a command word has been received on said serial communication channel; and (b) a reset circuit responsive to said serial data from said serial synchronous communication channel for establishing a reset condition when all bits of said command word are at a first logic state, and for removing said reset condition upon receipt of a bit at a second logic state.

8. Circuitry for resynchronizing a peripheral as set forth in claim 7 wherein said reset circuit comprises an N-bit serial to parallel converter having an input coupled to said serial data input terminal and providing N bits of parallel data, where N is the number of bits in said command word.

9. Circuitry for resynchronizing a peripheral as set forth in claim 7 wherein said reset circuit further comprises an N-bit data latch for receiving and latching N bits of data onto N data output lines in response to said output of said counter circuit, and for causing said N data output lines to be at said first logic state when said peripheral is in said reset condition.

10. Circuitry for resynchronizing a peripheral as set forth in claim 9 wherein said reset circuit further comprises a logic gate having N inputs, each coupled to one of said N data output lines for providing an output signal when all of said N data output lines are at said first logic state.

11. Circuitry for resynchronizing a peripheral as set forth in claim 7 wherein said reset circuit further comprises two cross coupled NAND gates forming a data latch and having an output which causes said peripheral to enter into said reset condition when said output of said data latch is reset, and removes said reset condition when said output of said data latch is set, said output of said data latch becoming reset when all bits of said command word are at said logic state and becoming set when a bit of said second logic state is received.

12. A synchronous serial interface between a controller and a peripheral comprising:

a) a data in line from said controller to said peripheral for transferring a serial data from said controller to said peripheral;

b) a data out line from said peripheral to said controller for transferring serial data from said peripheral to said controller;

c) a serial clock line for transferring a serial clock signal from said controller to said peripheral;

d) a chip select line for transmitting an enable signal from said controller to said peripheral;

e) a data ready line for transmitting a data ready signal from said peripheral to said controller when said peripheral is ready to send serial data to said controller; and f) circuitry inside said peripheral for resynchronizing said peripheral with said controller as set forth in claim 7.

13. A synchronous serial interface between a controller and a peripheral consisting of three signal lines between said controller and said peripheral, said interface comprising:

a) a data in line from said controller to said peripheral for transferring a serial data from said controller to said peripheral;

b) a data out line from said peripheral to said controller for transferring serial data from said peripheral to said controller;

c) a serial clock line for transferring a serial clock signal from said controller to said peripheral; and f) circuitry inside said peripheral for resynchronizing said peripheral with said controller as set forth in claim 7.

14. A method for transmitting synchronous serial data between a controller and a peripheral comprises the steps of:

(a) transmitting during normal operation serial data which is free of synchronization bits and which contains a plurality of command words;

(b) upon detection of an out of synchronization condition transmitting a sequence of a repeating predetermined bit pattern from said controller, said repeating predetermined bit pattern being of a long enough duration such that said peripheral will decode at least a portion of said repeating, predetermined bit pattern as a command word;

(b) resetting said peripheral upon receipt by said peripheral of said command word having bits according to said repeating predetermined bit pattern;

(c) transmitting from said controller, after the transmission of said predetermined bit pattern of said long enough duration, a different pattern than said repeating predetermined bit pattern and then normal serial data;

(d) detecting, in said peripheral, a first bit opposite to the logic state of the next bit in said predetermined bit pattern, and decoding the next series of bits as normal serial data.

15. The method set forth in claim 14 wherein said predetermined bit pattern are all bits of a first logic state.

* * * * *